United States Patent [19]

Bryant

[11] Patent Number: 4,999,662
[45] Date of Patent: Mar. 12, 1991

[54] METHOD AND APPARATUS FOR INDICATING AN OPERATING CONDITION OF A CAMERA PRIOR TO USE

[75] Inventor: Robert S. Bryant, Rochester, N.Y.

[73] Assignee: Eastman Kodak Company, Rochester, N.Y.

[21] Appl. No.: 528,315

[22] Filed: May 24, 1990

[51] Int. Cl.$^5$ .............................................. G03B 7/00
[52] U.S. Cl. .................................... 354/412; 354/430; 354/266; 354/465
[58] Field of Search ................ 354/412, 430, 266, 465

[56] References Cited

U.S. PATENT DOCUMENTS

| | | | |
|---|---|---|---|
| 4,264,161 | 4/1981 | Hosoe et al. | 354/430 |
| 4,320,948 | 3/1982 | Hosoe et al. | 354/430 |
| 4,327,985 | 5/1982 | Urushihara et al. | 354/289 |
| 4,346,978 | 8/1982 | Taniquchi et al. | 354/289 |
| 4,348,096 | 9/1982 | Katsuma et al. | 354/289 |
| 4,448,510 | 5/1984 | Murakoshi | 354/289.12 |
| 4,801,793 | 1/1989 | Vaynshteyn | 354/289.12 |

Primary Examiner—Russell E. Adams
Attorney, Agent, or Firm—Edward Dugas

[57] ABSTRACT

A method and apparatus for indicating an improper operating condition of a camera prior to use of the camera utilizes a motion detector which detects handling of the camera by the photographer when the camera is turned off. The motion detector provides an output to activate analyzing circuitry which analyzes an operating condition of the camera such that when an improper operating condition is indicated, an alarm is issued to advise the photographer of the improper operating condition.

10 Claims, 7 Drawing Sheets

METHOD AND APPARATUS FOR INDICATING AN OPERATING CONDITION OF A CAMERA PRIOR TO USE

BACKGROUND OF THE INVENTION

1. Field of the Invention

The present invention generally relates to a method and apparatus for indicating an operating condition of a camera prior to use of the camera and more particularly to a method and apparatus for alerting a photographer to an improper operating condition.

2. Discussion of the Background

Photographic cameras are known which present various types of data to a photographer, particularly when improper photographic conditions are detected. One such camera arrangment is disclosed by U.S. Pat. No. 4,448,510 wherein a camera detection apparatus is disclosed which activates an alarm to indicate the possibility of blur in an image taken due to shaking of the camera. The alarm can be a visual alarm, such as a light emitting diode or alternatively, an audible alarm generated by a piezoelectric device or the like. In either case, the detector arrangement is activated only after the camera has been used, i.e., a picture has been taken.

Additionally, it is known to check a specific condition of a camera, for example, a battery voltage level, using a manually activated check switch, as shown in U.S. Pat. No. 4,327,985.

An orientation indicating apparatus for a camera, as disclosed by U.S. Pat. No. 4,801,793, provides an indication on a display that the camera is deviated improperly from its normal horizontal position before a picture is taken. A pendulum switch is provided which controls an orientation display to indicate an inclined-left or inclined-right condition. In operation, a shutter release button is first depressed half way to close a normally open switch to electrically activate the orientation display prior to exposure of the film.

Although the above-noted indicator arrangements are operationally quite efficient, one particular disadvantage common to each of the arrangements is that an alarm condition is activated only after the manual operation or partial operation of an alarm control activator, such as, a shutter release button or a manually activated check switch. As a result, a camera operator can forget to activate the check switch or is informed of an improper photographic condition only after the process of picture taking has begun.

Thus, the photographer can miss an important scene, particularly a fast moving action scene or a scene which requires considerable preparation, if the improper photographic condition is indicated only after the picture taking process has begun and the improper photographic condition must be remedied before the picture can be taken. These are particularly disadvantageous situations if the improper photographic condition is that only a small number of unexposed frames of film remain in the camera, or no film is present in the camera at all. As a result, the photographer can be placed in a position where, after preparing to take a series of photographs, or preparing to cover a particular event, the camera must be removed to a darkened area and the film changed or alternatively, the photographer will run out of available film prior to completion of the picture taking series or event being photographed.

SUMMARY OF THE INVENTION

Therefore, it is an object of the present invention to provide a method and apparatus for indicating an improper operating condition of a camera prior to use of the camera.

It is a further object of the present invention to provide a method and apparatus for indicating an improper condition of a camera without the need for a photographer to operate any feature of the camera.

Still a further object of the present invention is to provide a method and apparatus for automatically alerting a photographer that only a few unexposed frames of film, or no film at all, is currently available in the camera.

Still another object of the present invention is to provide a method and apparatus for indicating an improper operating condition of a camera which provides a substantial added value to the camera at a low cost.

One particular advantage of preferred embodiments of the present invention is that a photographer is automatically advised of an improper photographic condition prior to commencement of a picture taking process. In fact, according to preferred embodiments of the present invention, an operating condition of the camera is analyzed and an indication is provided at the initial step of the picture taking process, i.e., when the photographer first picks up the camera. Thus, the photographer has an opportunity to correct the improper photographic condition before he has removed the camera to a desired location.

In accordance with preferred embodiments of the present invention, these and other objects, advantages, and features of the present invention are accomplished by a method for indicating an improper operating condition of a camera prior to use thereof comprising the steps of detecting handling of the camera by a photographer when the camera is switched off, analyzing an operating condition of the camera when handling of the camera by the photographer is detected and activating an alarm when the analysis of the operating condition of the camera indicates an improper operating condition.

According to a further embodiment of the method of the present invention, the analyzing step further comprises the steps of determining a number of unexposed picture frames in the camera available for exposure and comparing the number of unexposed picture frames with a predetermined number to provide an indication of an improper operating condition when the number of unexposed picture frames in the camera is less than or equal to the predetermined number. In this manner, the photographer is automatically advised of a small number of unexposed picture frames left in the camera and prevents a photographer from running out of film.

According to yet another embodiment of the method of the present invention, the analyzing step comprises the steps of determining if the camera contains a film can and providing an indication if no film can is in the camera. This embodiment is particularly adapted to low cost cameras and provides the same advantages of high value at a low cost of a more complicated embodiment of the present invention.

According to a further embodiment of the present invention, an apparatus is provided comprising a motion detector which is turned on when the camera is turned off. The motion detector can be, for example, an inexpensive mercury switch which completes an electric circuit when the camera is moved to activate an operating condition sensing circuit for analyzing an operating condition of the camera. Should an improper operating condition be indicated by the sensing circuit, an alarm is activated to alert the photographer of the specific improper operating condition.

According to a further embodiment of the apparatus of the present invention, a motion analyzer is further included which analyzes outputs from the motion detector to distinguish between spurious movements and actual handling of the camera by the photographer. This not only reduces electrical power requirements but also eliminates the possibility of unwanted activation of the sensing arrangement due to normal jostling of the camera in a car or the like.

According to yet another embodiment of the apparatus of the present invention, a camera frame counter is provided which stores, in a nonvolatile memory, the number of frames of film which have been exposed on a given roll currently in the camera. This information is compared in a comparator with DX encoded information read from a film can loaded into the camera, the information being stored in a memory to indicate the total number of available exposures on the film roll currently loaded into the camera. Thus, should the film have 36 or 24 exposures, this particular condition is taken into account by the apparatus. The comparator compares the frame counter and DX encoded information to determine the number of unexposed frames remaining on the film. Should this number be less than or equal to a predetermined number of frames, an alarm circuit is enabled to advise the photographer of a low number of exposures remaining in the camera.

According to yet another embodiment of the apparatus of the present invention, particularly adapted for low cost cameras which may not include both a frame counter and an arrangement for reading DX encoded information, a film in camera detector circuit is provided, for example, a microswitch which senses the presence or absence of a film can, such that after motion of the camera is detected, an alarm is activated should the film in camera detector circuitry indicate that no film can is currently loaded into the camera.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
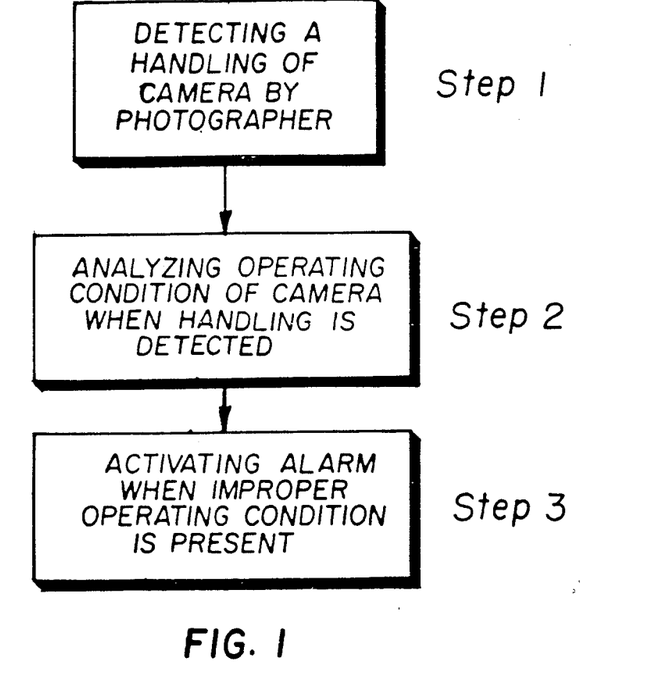
FIG. 1 is a flow diagram illustrating one embodiment of the method of the present invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein: referring to FIG. 1, one embodiment of a method for indicating an operating condition of a camera, according to the present invention, is illustrated which comprises the steps of: (1) detecting a handling of a camera by a photographer; (2) analyzing an operating condition of the camera when handling of the camera by the photographer is detected; and (3) activating an alarm when an improper operating condition is present.

Typically, the detection step can be accomplished by any suitable motion detector which is, for example, activated when the camera is turned off to provide an output, when motion is detected, which activates analyzing circuitry for analyzing any one of a plurality of operating conditions of the camera. In this regard, the operating condition monitored can include the presence or absence of film in the camera, a low battery condition, a low number of available unexposed picture frames, or any other operating condition of a camera which is known to be analyzed and indicated to a photographer.

After the analyzing circuitry has been activated, and the operating condition of the camera has been analyzed, an alarm is activated when an improper operating condition is present. The alarm comprises any suitable alarm including a visual indicator, such as an LED, or preferably an audible alarm, such as generating by a piezoelectric device, or a combination of both a visual and audible alarm.

Figure 2:
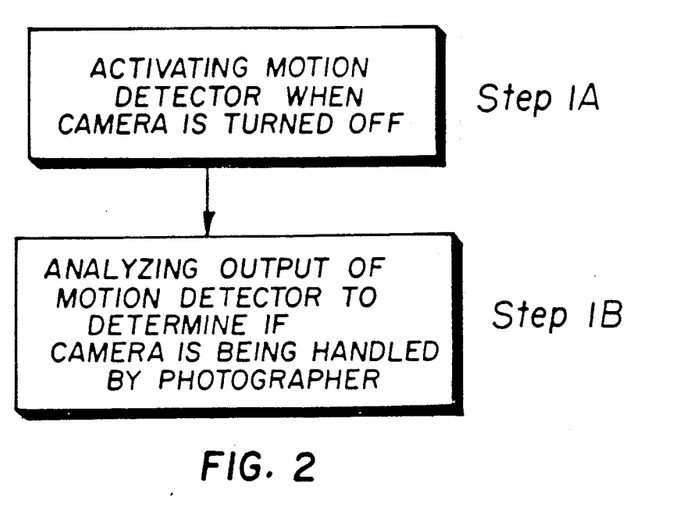
FIG. 2 illustrates further embodiment of the method wherein the output of a motion detector is analyzed to determine if the camera is being handled by a photographer.

Since a simple motion detector will provide activation of the analyzing condition of the camera under a variety of conditions other than the handling of the camera by the photographer, according to a further embodiment of the method of the present invention, as illustrated in FIG. 2, the output of the motion detector is analyzed in step 1B to determine if the camera is being handled by the photographer. This arrangement prevents spurious activation of the indicating arrangement, which can be annoying, particularly should the camera be positioned in a passenger compartment of a vehicle which is subject to jostling or the like and also conserves the limited power supply of the camera.

Referring to FIG. 2, the motion detector is preferably activated in step 1A after the camera has been turned off. In this manner, conservation of the power supply is assured. The activated motion detector provides, for example, a pulse output with each jostling or movement of the camera as will be described in more detail with particular reference to FIG. 6 hereinafter. Each pulse output of the motion detector is counted by a counting arrangement and once a predetermined number of pulses has occurred, the counter activates as relay switch which provides power to the analyzing circuitry of the present invention.

Figure 3A:
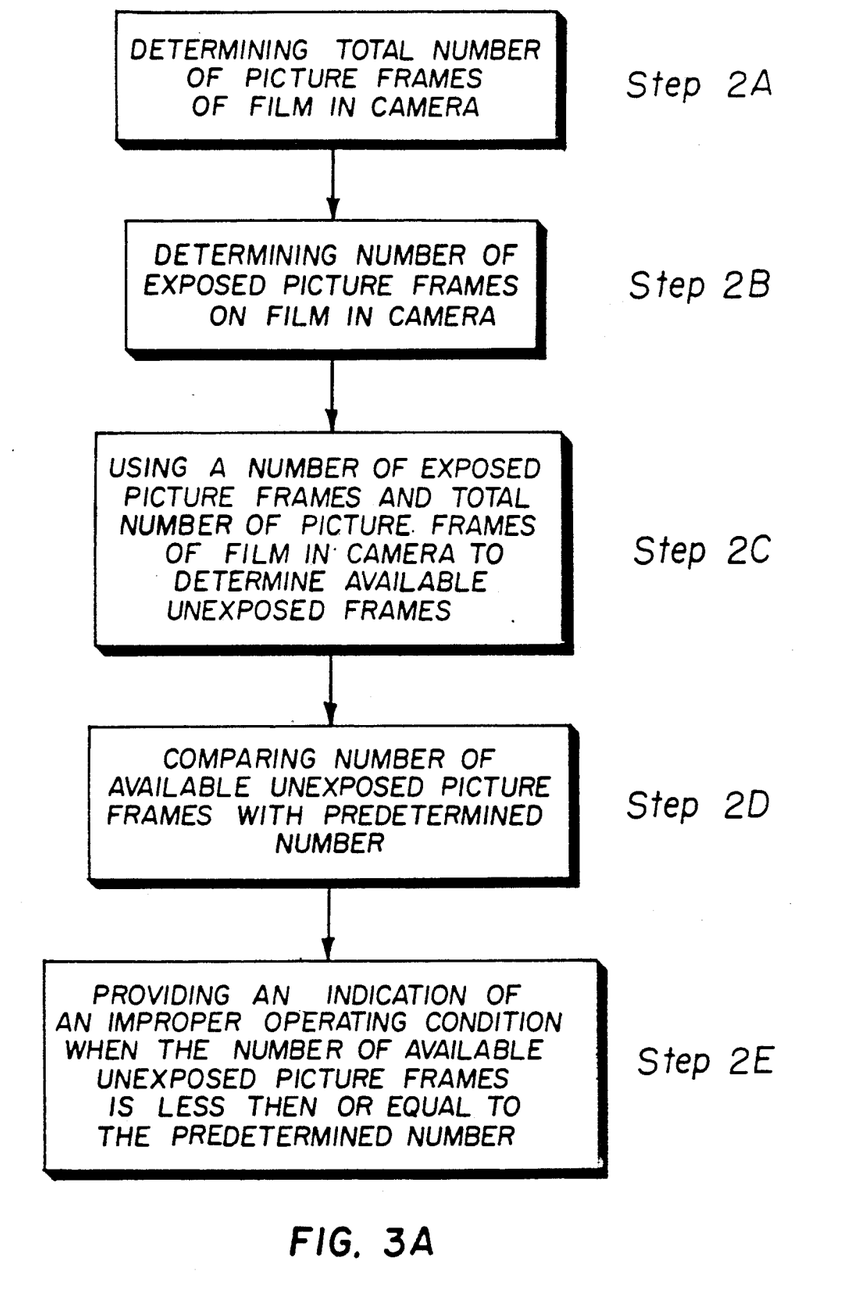
FIGS. 3A–3B are further embodiments of the method of the present invention wherein the operating condition analyzed is a number of available unexposed picture frames on film loaded in the camera.

FIG. 3A illustrates yet another embodiment of the method of the present invention wherein the operating condition of the camera which is analyzed is the available number of unexposed picture frames on a film in the camera. Because film comes in a variety of sizes offering a different total number of unexposed picture frames, according to this embodiment of the present invention, the total number of picture frames available on the roll of film currently loaded in the camera is determined. This can be accomplished, in step 2A of FIG. 3A, by means of a DX encoded information reader which reads DX encoded information off of the film can. In order to determine the number of exposed picture frames on the film roll in the camera as required by step 2B of FIG. 3A, a camera frame counter, for example as typically provided in a camera, is provided with a non-volatile memory for storing the number of frames which have been exposed.

The number of exposed picture frames received from the non-volatile memory of the camera frame counter and the total number of picture frames on the film in the camera are used to determine the number of unexposed picture frames remaining on the film camera in step 2C of FIG. 3A. The number of available unexposed picture frames is compared, in step 2D of FIG. 3A, with a predetermined number either set by the photographer or alternatively programmed into the analyzing circuitry, and an output to activate the alarm is provided, in step 2E of FIG. 3A, if the available number of unexposed picture frames is less than or equal to the predetermined number as will be more fully described with reference to FIG. 8.

Figure 3B:
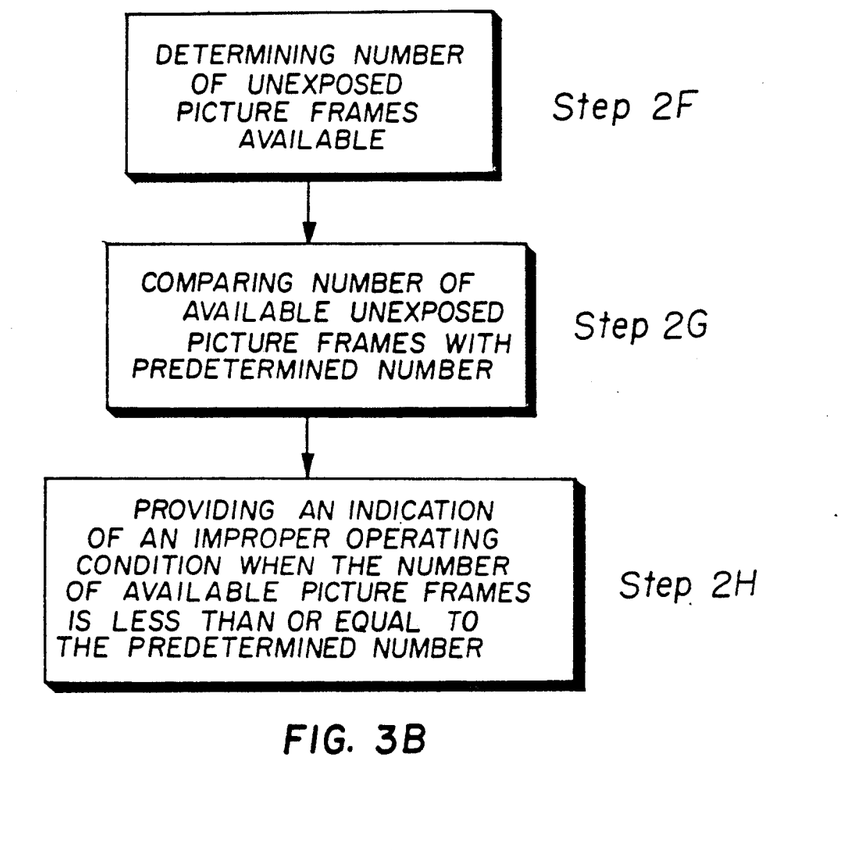

Referring to FIG. 3B, yet a further embodiment of the method is illustrated wherein the operating parameters of a comparator are set by an output from the reader of the DX encoded information provided on the film can and information inputted from the non-volatile memory of the frame counter to the comparator is used to determine, in step 2F of FIG. 3B, the number of unexposed picture frames available as will be described in more detail with respect to the apparatus of FIG. 9. Once set, the comparator compares, in step 2G of FIG. 3B, the number of available unexposed picture frames with a predetermined number and, as with the embodiment of FIG. 3A, provides an indication of an improper operating condition, in step 2H of FIG. 3B, when the number of available picture frames is less than or equal to the predetermined number.

Figure 4:
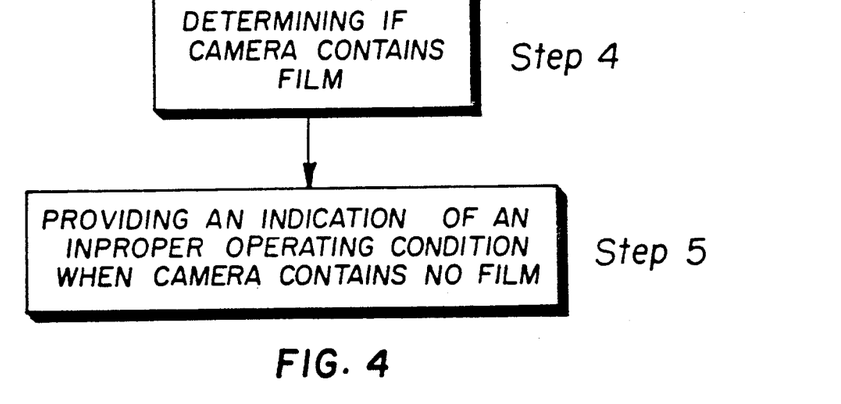
FIG. 4 is still another embodiment of the method of the present invention wherein the condition analyzed is the presence or absence of film in the camera.

Referring to FIG. 4, a further embodiment of the method of the present application is illustrated wherein the presence or absence of film in the camera is the operating condition analyzed. After the analyzing circuitry has been activated by the motion detector arrangement as described above, this circuitry determines in step 4 of FIG. 4 if a film can is currently present in the camera. If no film can is present, an output is provided, in step 5 of FIG. 4, as will be more fully described with reference to FIGS. 5 and 7 hereinafter, to indicate an improper operating condition of the camera and an alarm is generated.

Figure 5:
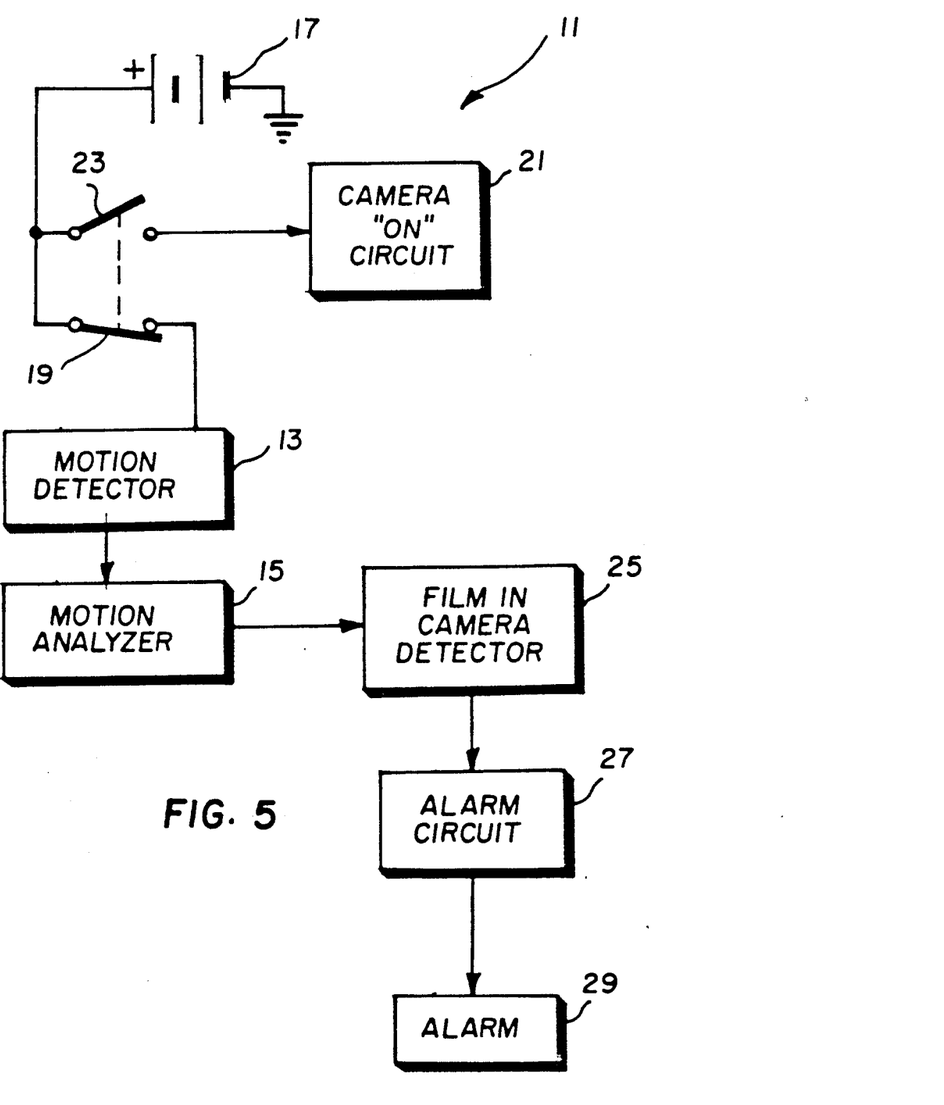
FIG. 5 is one embodiment of an apparatus for carrying out the embodiment of the method illustrated in FIG. 4.

Referring to FIG. 5, a first embodiment of an apparatus for indicating an improper operating condition of a camera is generally indicated at 11 and comprises a motion detector 13 having an output connected to a motion analyzer 15 and an input connected to a battery 17 via a switch 19 arranged so that when the camera circuitry 21 is turned off by switch 23, electrical power is provided from battery 17 to the motion detector 13. The output of the motion detector 13 is connected, via motion analyzer 15, to a film in camera detector 25 which provides an output to activate an alarm circuit 27 when no film is detected in the camera. Alarm circuit 27 activates an alarm 29 which comprises at least one of a visual and an audio indicator, such as, an LED or piezoelectric device, respectively.

Figure 6:
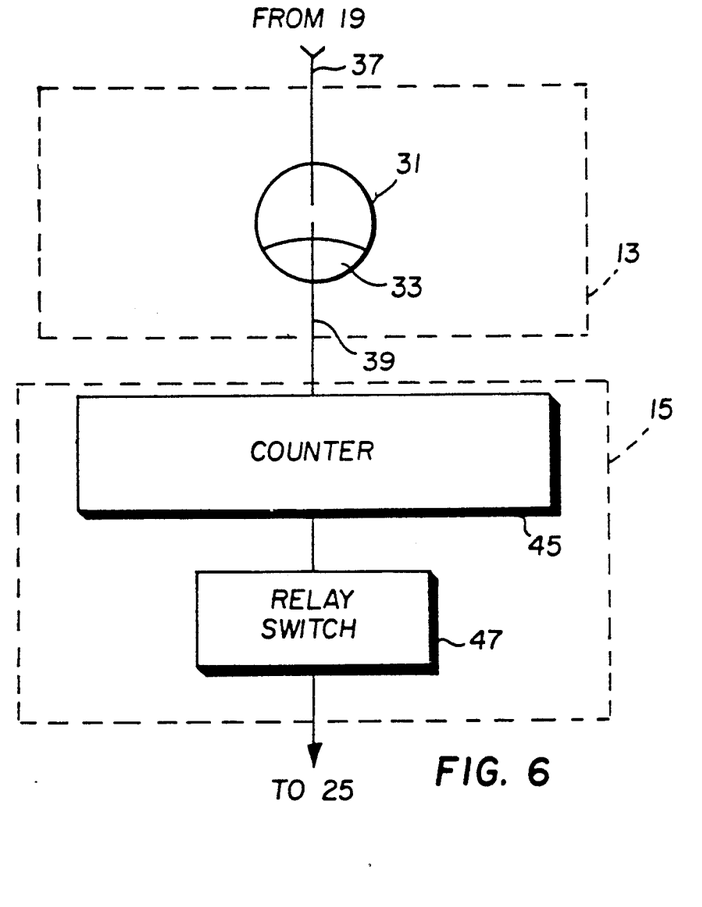
FIG. 6 is one embodiment of the motion detector and motion analyzer illustrated in FIG. 5.

Referring to FIG. 6, one embodiment of the motion detector 13 and motion analyzer 15 is shown. In this particular embodiment, the motion detector 13 comprises a mercury switch 31 containing a drop of mercury 33, the mercury switch 31 having an input lead 37 connected to the battery 17 via switch 19, and an output lead 39 connected to the motion analyzer 15.

As the mercury switch 31 is subjected to motion, such as, for example, when the camera is being handled by a photographer, the mercury drop 33 completes and breaks the circuit between leads 37 and 39 to provide pulsed outputs to a counter 45 of the motion analyzer 15. Once the counter 45 has counted a predetermined number of pulses from mercury switch 31, the counter 45 activates a relay switch 47, to provide power to the film in camera detector 25.

Figure 7:
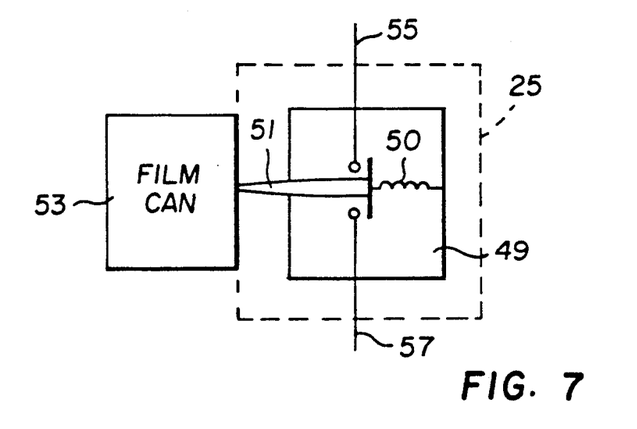
FIG. 7 is one embodiment of the film in camera detector circuitry according to the embodiment illustrated in FIG. 5.

Referring to FIG. 7, one embodiment of the film in camera detector 25 is illustrated and comprises a microswitch 49 having, for example, a spring biased toggle 51 which is pressed against the spring force of a spring 50 when a film can 53 is loaded into the camera to break an electrical connection between an input lead 55 connected to the relay switch 47 and an output lead 57 connected to the alarm circuit 27. If no film can is present, the spring 50 pushes the toggle 51 towards the leads 55, 57 to close the electrical circuit therebetween. The alarm circuit 27 can be arranged for activation of an alarm 29 when the microswitch provides either one of a high or low signal from lead 57 depending on the arrangement of the microswitch 49.

Figure 8:
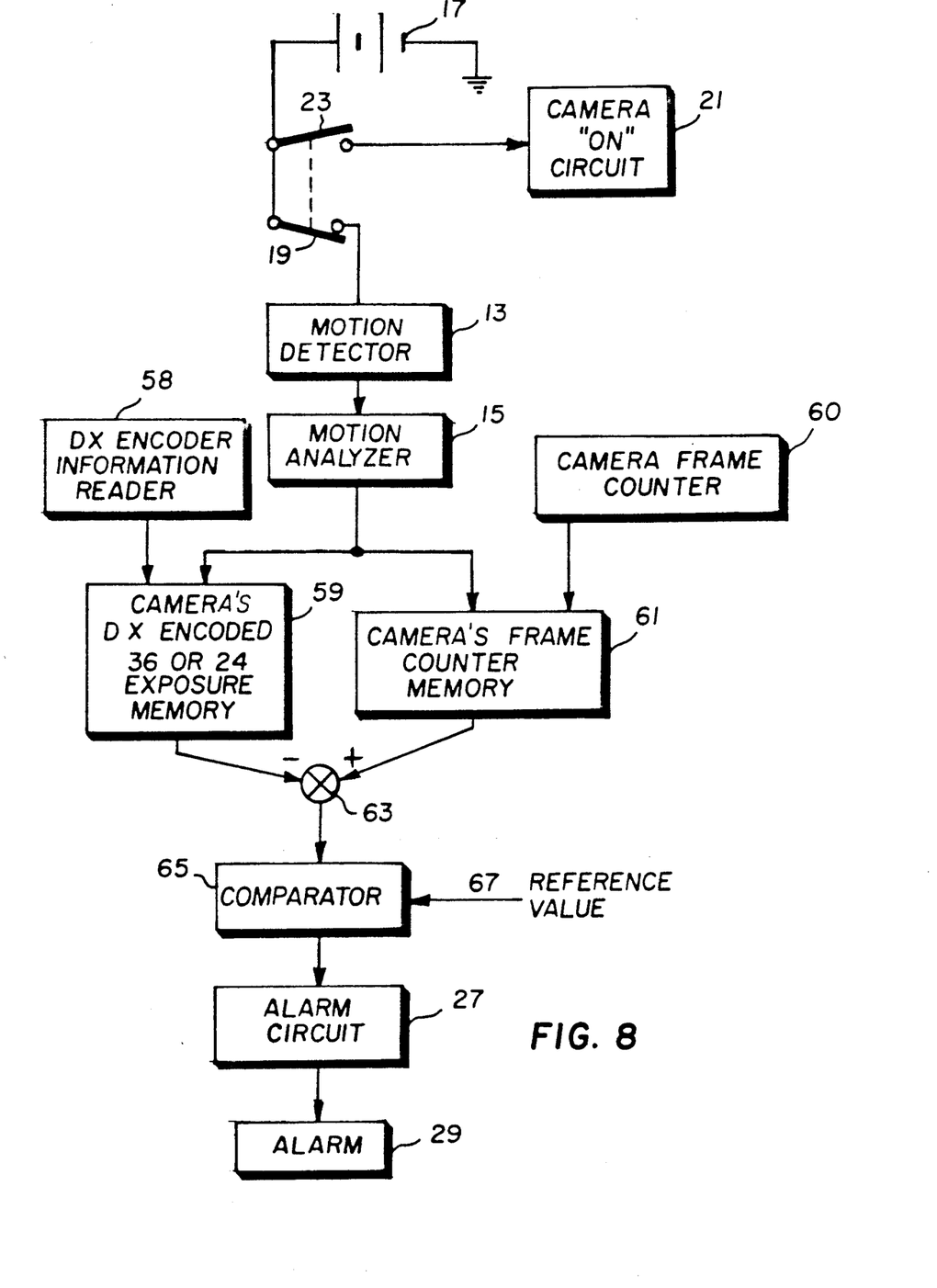
FIG. 8 is yet another embodiment of the apparatus for determining the available number of unexposed picture frames on film in the camera.

Referring to FIG. 8, yet another embodiment of the apparatus of the present invention is illustrated which comprises a motion detector 13 having an output connected to a motion analyzer 15 and an input connected to a battery 17 by means of a switch 19 which is closed when camera on circuit 21 is deactivated by switch 23. In this arrangement, the operating condition of the camera which is analyzed pertains to the available number of unexposed picture frames on a film roll currently loaded in the camera.

In the embodiment of FIG. 8, DX encoded information, read from the film can by a DX encoded information reader 58, is stored in memory 59 and the number of exposed picture frames generated from the camera's frame counter circuit 60 is stored in a non-volatile memory 61. A subtracting circuit 63 subtracts the total number of exposures on the film as stored in memory 59 from the number of pictures which have already been taken as indicated by the camera frame counter memory 61 to determine the available number of unexposed picture frames remaining on the film. This value is inputted to a comparator 65 and compared with a reference value 67 which can be preprogrammed or programmed into the circuit arrangement by the photographer, the reference value 67 being indicative of a minimum acceptable number of available unexposed picture frames.

The comparator 65 generates an output when the value of the number of unexposed picture frames remaining on the film roll is less than the reference value 67. The output of comparator 65 activates an alarm circuit 27 to activate an alarm 29 as with the previous embodiment described with respect to FIG. 5.

Figure 9:
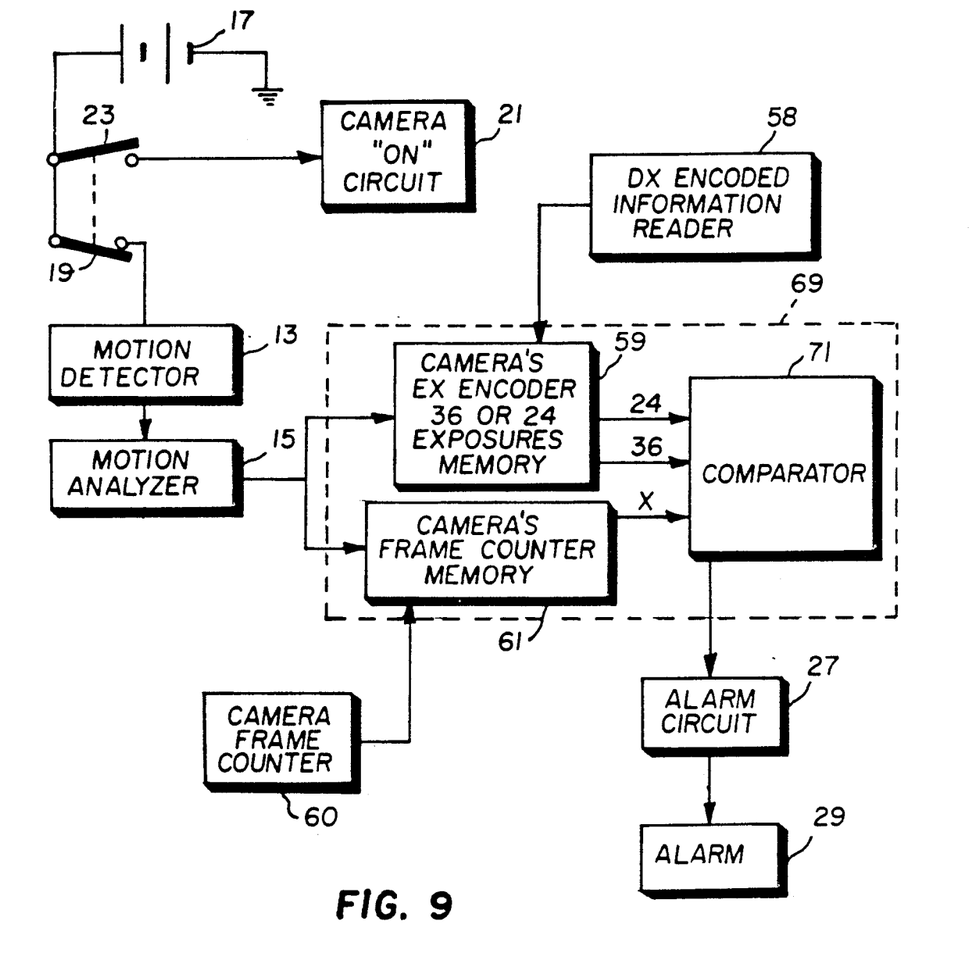
FIG. 9 is still a further embodiment of the apparatus for determining the available number of unexposed picture frames on film in the camera.

FIG. 9 discloses yet another embodiment of the present invention, similar to the embodiment of FIG. 8, for providing a warning indication when the number of unexposed picture frames remaining on the film becomes low. As with the previous apparatus embodiments described with respect to FIGS. 5 and 8, the embodiment of FIG. 9 utilizes a motion detector 13 having an output connected to a motion analyzer 15 and an input connected to a battery 17 through a switch 19 which is closed when camera "on" circuitry 21 is switched off with the opening of switch 23.

The output of the motion detector 13 is analyzed by the motion analyzer 15, as previously described, so as to activate operating condition analyzing circuitry 69 when the camera is being handled by a photographer.

The operating condition analyzing circuitry 69 comprises the memory 59 for storing DX encoded information read by reader 58 as indicated on a film can and the nonvolatile camera frame counter memory 61 for storing the total number of frames exposed as indicated by the camera frame counter 60. The DX encoded information stored in memory 59 is input into a comparator 71 to set an operating parameter of the comparator 71 so that a reference value is set depending on the total number of exposures provided by the film as indicated by the DX encoded information. The camera's frame counter memory 61 outputs an output X which is compared by the comparator 71 with the reference value set by the input from the camera's DX encoded information provided by memory 59.

As with the embodiment of FIG. 8, the alarm circuit 27 is activated by the comparator 71 when the difference between the total number of frames on the film and the number of exposures taken is less than a predetermined value, this value being either preprogrammed or programmed individually by the photographer as with the embodiment of FIG. 8. The alarm circuit 27 then activates an alarm 29 as previously described.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for indicating an operating of a camera prior to use thereof, comprising the steps of:
   (a) detecting handling of the camera by a photographer;
   (b) analyzing an operating condition of the camera when handling of the camera by the photographer is detected; and
   (c) generating an alarm when the analysis of the operating condition indicates an improper operating condition.

2. A method according to claim 1, wherein the analyzing step (b) comprises the steps of:
   (d) determining a number of unexposed picture frames available for exposure on film loaded in the camera;
   (e) comparing the number of unexposed picture frames with a predetermined value; and
   (f) providing an indication of an improper operating condition when the number of unexposed picture frames is less than or equal to the predetermined value.

3. A method according to claim 1, wherein the analyzing step (b) comprises the steps of:
   (g) determining if the camera contains film; and
   (h) providing an indication of an improper operating condition when the camera is determined not to contain film.

4. A method according to claim 1, wherein the detecting step (a) comprises the steps of:
   (i) activating a motion detector, when the camera is turned off, which provides an output each time the camera is moved; and
   (j) analyzing the outputs of the motion detector to discriminate between spurious movement and handling of the camera by the photographer.

5. A method according to claim 4, wherein the analyzing step (j) comprises the steps of:
   (k) counting a number of outputs generated by the motion detector;
   (l) comparing the number of outputs generated by the motion detector with a predetermined number; and
   (m) determining that the camera is being handled by the photographer when the number of outputs from the motion detector is greater than or equal to the predetermined number.

6. An apparatus for indicating an operating condition of a camera prior to use thereof, comprising:
   detector means for detecting handling of the camera by a photographer;
   analyzing means for analyzing an operating condition of the camera when handling of the camera by the photographer is detected; and
   alarm generating means for generating an alarm when the analyzing means indicates an improper operating condition.

7. An apparatus according to claim 6, wherein the detector means comprises:
   a motion detector for providing an output each time the camera is moved;
   a counter for counting each output from the motion detector and for activating the analyzing means when a number of outputs from the motion detector is at least equal to a predetermined value.

8. An apparatus according to claim 6, wherein the analyzing means comprises:
   a film in camera detector for detecting one of a presence and absence of film in the camera; and
   alarm activation means for activating the alarm generating means when the absence of film is detected.

9. An apparatus according to claim 6, wherein the analyzing means comprises:
   DX encoded information reading means for reading, from film loaded in the camera, DX encoded information which indicates a total number of exposures provided by the film;
   total exposure memory means for storing the total number of exposures read by the DX encoded information reading means;
   a frame counter to generating an output indicative of a total number of exposures taken;
   a non-volatile frame counter memory means for storing the total number of exposures taken;
   comparator means for comparing the total number of exposures provided by the film with the total number of exposures taken and for enabling the alarm generating means when a difference therebetween is less than or equal to a predetermined number.

10. An apparatus according to claim 6, wherein the alarm generating means includes at least one of an audio and visual alarm.

* * * * *